United States Patent [19]
Suzuki et al.

[11] Patent Number: 5,856,664
[45] Date of Patent: Jan. 5, 1999

[54] AUTOMATIC FOCUSING APPARATUS FOR DETECTING AND CORRECTING FOCUS STATE OF IMAGE OPTICAL SYSTEM

[75] Inventors: Shinichi Suzuki; Masahiro Nakata, both of Tokyo, Japan

[73] Assignee: Asahi Kogaku Kogyo Kabushiki Kaisha, Tokyo, Japan

[21] Appl. No.: 819,138

[22] Filed: Mar. 17, 1997

[30] Foreign Application Priority Data

Mar. 15, 1996 [JP] Japan ................................. 8-059832

[51] Int. Cl.$^6$ ........................................... G01J 1/20
[52] U.S. Cl. .......................... 250/201.2; 356/11; 396/94
[58] Field of Search .......................... 250/201.2, 201.4, 250/201.7; 356/11, 4.04; 396/79, 80, 94, 111, 121

[56] References Cited

U.S. PATENT DOCUMENTS

| | | | |
|---|---|---|---|
| 4,394,569 | 7/1983 | Nakamura | 250/204 |
| 4,485,303 | 11/1984 | Suzuki | 250/201.2 |
| 4,491,402 | 1/1985 | Suzuki | 250/204 |
| 5,266,982 | 11/1993 | Soshi | 250/204 |
| 5,483,318 | 1/1996 | Hamada et al. | 396/121 |
| 5,530,514 | 6/1996 | Lisson et al. | 396/128 |
| 5,664,236 | 9/1997 | Utagawa | 396/128 |

FOREIGN PATENT DOCUMENTS 7159160  6/1995  Japan .

*Primary Examiner*—Que Le
*Attorney, Agent, or Firm*—Greenblum & Bernstein, P.L.C.

[57] ABSTRACT

An automatic focusing apparatus including a focus detecting device which detects a defocus amount of image optical system, a focusing device which focalizes based on the defocus amount calculated by the focus detecting device. An adjustment device which adjusts said defocus amount calculated by said focus detecting device by an adjustment value.

16 Claims, 12 Drawing Sheets

Fig. 5

(A) digital switch

| SW | SW data | offset amount (10um step) [um] |
|---|---|---|
| 0 | 0 | 0 |
| 1 | 1 | 10 |
| -- | -- | -- |
| 7 | 7 | 70 |
| 8 | -8 | -80 |
| 9 | -7 | -70 |
| -- | -- | -- |
| 15 | -1 | -10 |

(B) digital switch

| SW | SW data | offset amount (10um step) [um] |
|---|---|---|
| 0 | 0 | 0 |
| 1 | 1 | 10 |
| -- | -- | -- |
| 127 | 127 | 1270 |
| 128 | -128 | -1280 |
| 129 | -127 | -1270 |
| -- | -- | -- |
| 255 | -1 | -10 |

AUTOMATIC FOCUSING APPARATUS FOR DETECTING AND CORRECTING FOCUS STATE OF IMAGE OPTICAL SYSTEM

BACKGROUND OF THE INVENTION

1. Field of the Invention

The present invention relates to an automatic focusing apparatus which can be applied to an auto-level, a theodolite or a transit instrument etc., having a telephotographic system.

2. Description of the Related Art

A surveying instrument, such as an auto-level, a theodolite or a transit instrument etc., is provided with a collimating telescope, a level, and scales for measuring a rotative angle and/or an elevational angle. The surveying instrument is first horizontally set and its horizontal and vertical angles are then adjusted, so that an operator may observe a collimation point or object through a collimating telescope.

A typical surveying instrument having a collimating telescope is provided, in order from the object side, with an objective lens, a focusing lens and an eyepiece. The position of the focusing lens is adjusted according to the distance from the object, so that an image of the object may be formed on a focusing plate (reticle). The operator may thus observe, via the eyepiece the image superimposed on the reticle.

For example, provided that the range of the object distance is between 1 m—infinity (a very wide range in comparison with a telescope or binoculars), and that the focusing lens is a concave lens, the approximate amount of movement of the focusing lens is 30 mm. The focusing lens is normally driven through the operation of a rotative knob. If the amount of movement of the object image, i.e., the amount of movement of the focusing lens, is set smaller in regard to the rotational angle of the rotational knob, the amount of movement of the object image becomes smaller in comparison with the rotational angle, but it takes some time to move the lens. On the other hand, if the amount of movement of the object image is set larger with respect to the rotational angle of the rotative knob, the amount of movement of the object image becomes too big as compared with the rotational angle, which leads to difficulty in stopping the object image on the reticle.

Additionally, if the object is distant, the object image moves a large amount forward and backward through a slight operation of the rotational knob in the rotational direction. On the other hand, if the object is positioned relatively close to the focusing lens, the amount of movement of the object image becomes smaller as compared with the amount of rotational of the rotative knob, thus the rotational knob must be moved a great deal for the purpose of moving the object image on the reticle. In such a case, it is difficult to determine whether the object aimed at is in a front focus or a rear focus position, which may lead the operator to rotate the rotational knob in the wrong direction with respect to the focal point. In any event, a conventional auto-level suffers from the defect that it takes too much time to focus.

In such circumstances as described above, a collimating telescope is provided with a so-called passive automatic focusing apparatus. As is well known, this (passive) phase difference type of automatic focusing apparatus is provided with an AF line sensor that receives light by a pair of CCD line sensors. The pair of CCD line sensors are positioned at an optically equivalent position to a focusing plate. An optical path of the telephotographic system diverges, and the luminous flux of the object in the diverged optical path is split into two beams. The split beams respectively form object images on re-forming lenses, and the re-formed object images are received by the above-mentioned CCD line sensors. The defocus amount is detected by the image data output from the pair of CCD line sensors, based on the phase difference (interval) of object images formed on the pair of CCD line sensors, then the focusing adjustment is performed.

However, a conventional AF sensor may suffer in the case that the design optical distance or the focusing position of the lens is not obtained in practice, due to errors in assembling, or to humidity or temperature. Consequently, the phase of an object formed on the CCD line sensor is displaced from the original phase, which results in an error, (whether plus or minus), in the defocus amount. Consequently, the focusing may not be performed on the object aimed at due to focusing based on the erroneous defocus amount.

SUMMARY OF THE INVENTION

It is an object of the present invention to provide an automatic focusing apparatus, in which the mechanical or optical error can be easily amended by a user.

To achieve the object mentioned above, according to the present invention, there is provided an automatic focusing apparatus which incorporates an adjustment device. The adjustment device includes an external digital switch enabling easy adjustment by the user.

The adjustment value is a variable value. The variable adjustment value of the adjustment device can be changed by a user.

Preferably, multiple light receiving devices are provided which receive light of an object image formed by the telephotographic system. A focus state of the object image is detected based on an output from the light receiving devices involved in a focus detecting portion which symmetrically extends from the center of the visual field.

The automatic focusing apparatus is incorporated in a surveying instrument.

Preferably the telephotographic system is further provided with an objective lens group, a focusing lens group, a focusing plate having a reticle, an eyepiece lens group for observing an object image formed on the focusing plate, and a beam splitter optical system positioned between the focusing lens group and the focusing plate. The line sensor consists of multiple light receiving devices positioned horizontally along a light path split by the beam splitter optical system, by designating the reticle as center.

A calculating device is also preferably provided which calculates a defocus amount based on an output of the line sensors involved in a focus detecting portion which is judged as being effective by the judging device.

If the calculated contrast is less than the predetermined value, the light receiving time of the line sensors is controlled by the focus detecting device using the monitor sensor in the center.

A focusing lens driving device is preferably provided which drives the focusing lens group based on the focusing state detected by the focus detecting device.

The focus detecting device is a phase difference type of focal position detecting device. An optical path is preferably split into two beams, each of which is respectively formed on one of a pair of line sensors. A defocus amount is obtained by detecting the phase difference of images formed on the pair of line sensors.

The adjustment value is directly related to the defocus amount. If the defocus amount is for some reason erroneous, the optical distance or the focusing position of the lens has not been obtained. The user can turn the rotative knob, and the value of the adjustment is either added to or subtracted from the defocus amount, dependent upon the direction in which the user turned the rotative knob.

The present disclosure relates to subject matter contained in Japanese Patent Application No.08-59832 (filed on Mar. 15, 1996) which is expressly incorporated herein by reference in its entirety.

BRIEF DESCRIPTION OF THE DRAWINGS

The invention will be described below in detail with reference to the accompanying drawings, in which:

FIG. 5 is tables of relation of digital switches to offset adjustment values, in which (A) is in the case of four-bit digital switches, and (B) is in the case of eight-bit digital switches;

DESCRIPTION OF THE PREFERRED EMBODIMENTS

Figure 1:
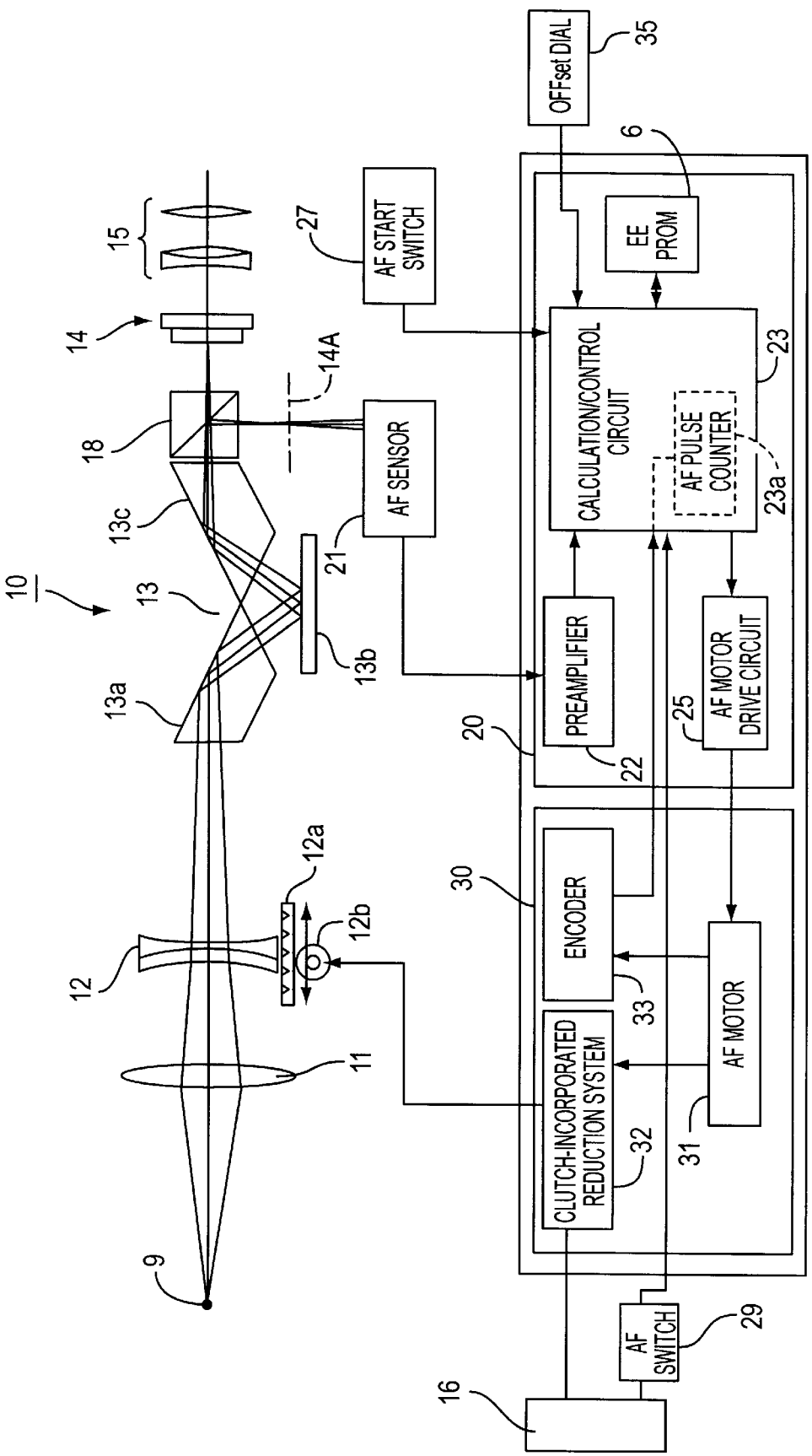
FIG. 1 is a block diagram of main elements of an embodiment of an auto-level to which the present invention is applied.

FIG. 1 shows an automatic focusing apparatus according to an embodiment of the present invention. An auto-level 10 consists of a collimating objective lens group 11 of positive power, a focusing lens group 12 of negative power, an optical horizontal compensation system 13 (13a, 13b, 13c), a focusing plate (which defines a focal plane) 14, and a positive eyepiece 15, in this order from an object side (left side of FIG. 1).

The optical horizontal compensation system 13, per se known consists of a first compensation prism 13a, a compensation mirror 13b, and a second compensation prism 13c, and has a symmetrical shape. The optical horizontal compensation system 13 is hung from a shaft by a string (not shown). The angle defined between the compensation mirror 13b and the first compensation prism 13a is identical in absolute-value but opposite in direction to the angle defined between the compensation mirror 13b and the second compensation prism 13c. The angle, for example 30°, varies depending on the length of the string, etc. When the optical horizontal compensation system 13 is set so that the optical axes of the objective lens group 11 and the focusing lens group 12 are substantially parallel (inclined at, for example, about 10 to 15 minutes with respect to the horizontal axis), light incident upon the first compensation prism 13a deviates from the horizontal direction by the same amount. However, the light reflected by and emitted from the first compensation prism 13a, the compensation mirror 13b and the second compensation mirror 13c, is substantially collimated.

The focusing lens group 12 is provided, as a lens moving means, with a rack 12a secured thereto, which is engaged by a pinion 12b. When the pinion 12b rotates to move the focusing lens group 12 in the optical axis direction, the image of an object (e.g., surveying staff) 9 formed by the objective lens group 11 and the focusing lens group 12 is translated along the optical axis. The operator views the object image formed on the focusing plate 14 9together with the reticle etc., drawn on the focusing plate 14), through the eyepiece 15.

A beam splitter (half mirror) 18 for splitting the light (or light path) is provided in the light path between the objective lens group 11 and the focusing plate 14. A focus detecting system (focus detector) 20 is provided in the split light path to detect the focus state (state of the formed image) at a surface 14A. The surface 14A is at a position optically equivalent to the focusing plate 14. The focusing lens 12 is driven by a lens driver 30 in accordance with the output of the focus detector 20.

Figure 2:
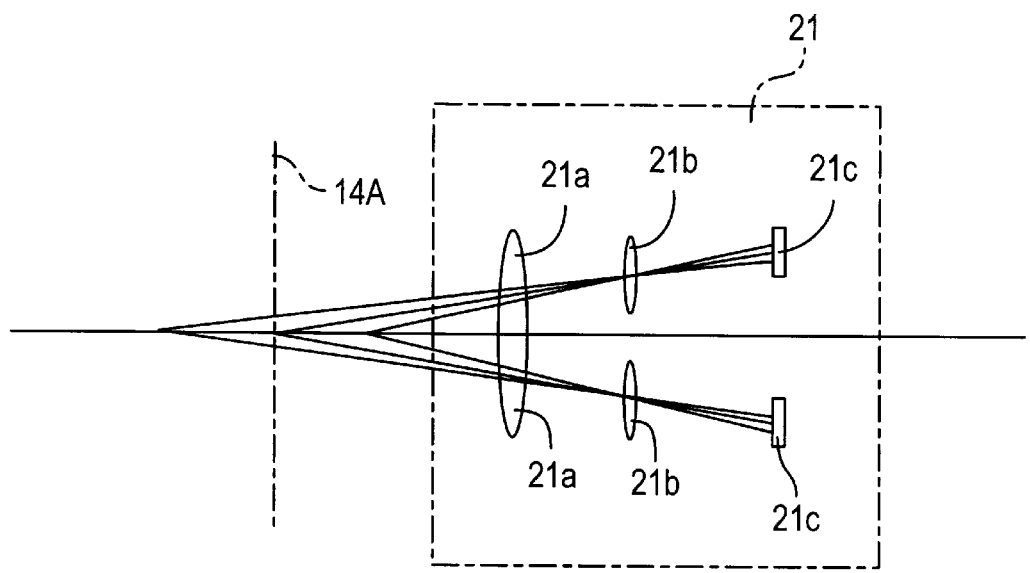
FIG. 2 is a schematic plan view of an embodiment of an AF sensor of an auto-level according to the present invention.

The focus detector 20 includes an AF sensor 21 located in the vicinity of the equivalent surface 14A, for detecting the defocus amount in accordance with the output of the AF sensor 21. In the illustrated embodiment in FIG. 2, a phase difference type AF sensor 21 used. In the phase difference AF sensor 21, the object image on the equivalent surface 14A is split by a condenser lens 21a and a pair of separator lenses (image forming lenses) 21b spaced at a distance identical to the base length, and is re-formed on a pair of CCD line sensors 21c. The position of object image incident upon the pair of CCD line sensors 21c varies according to the focal points of the object 9. That is, the focal points correspond to the positions when the image of the object 9 is accurately formed on the equivalent surface 14A (focused), when formed in front of the equivalent surface 14A (front focus), or when formed beyond the equivalent surface 14A (rear focus). The amount of deviation from the focal point (defocus amount) can be judged from the position of an object image formed on the pair of CCD line sensors 21c.

Figure 3:
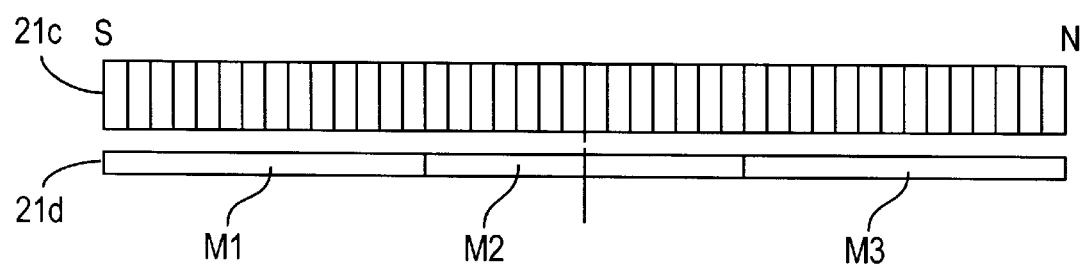
FIG. 3 is a schematic view of a reference CCD sensor of an AF sensor according to the present invention.

The CCD line sensors 21c, shown in a schematic view in regard to the reference section thereof in FIG. 3, each are provided, with a number of photoelectric transducers (light receiving elements) which convert the object image received thereby into electric charges which are integrated (accumulated). The integrated charges are successively output as AF sensor data.

The pair of CCD line sensors 21c are positioned with regard to the reticle provided in the focusing plate 14 so that the collimation axis of the reticle is positioned at the center between the CCD line sensors 21c (design center), and parallel to the horizontal line of the reticle. The horizontal line of the reticle is positioned at the vertical center of the CCD line sensors 21c.

However, due to error in assembling, or to humidity or temperature, the optical path of the AF sensor 21 may expand or contract, making the length of the optical path different from the design length. In such cases, images of a pair of aiming objects on the pair of CCD line sensors 21c are formed in front or back of the design positions, and the defocus amount calculated is therefore different from the actual defocus amount. Consequently, focusing is performed on an in accurate position in front or at the back of the actual aiming object, and the user may observe only an image of the aiming object out of focus.

Figure 4:
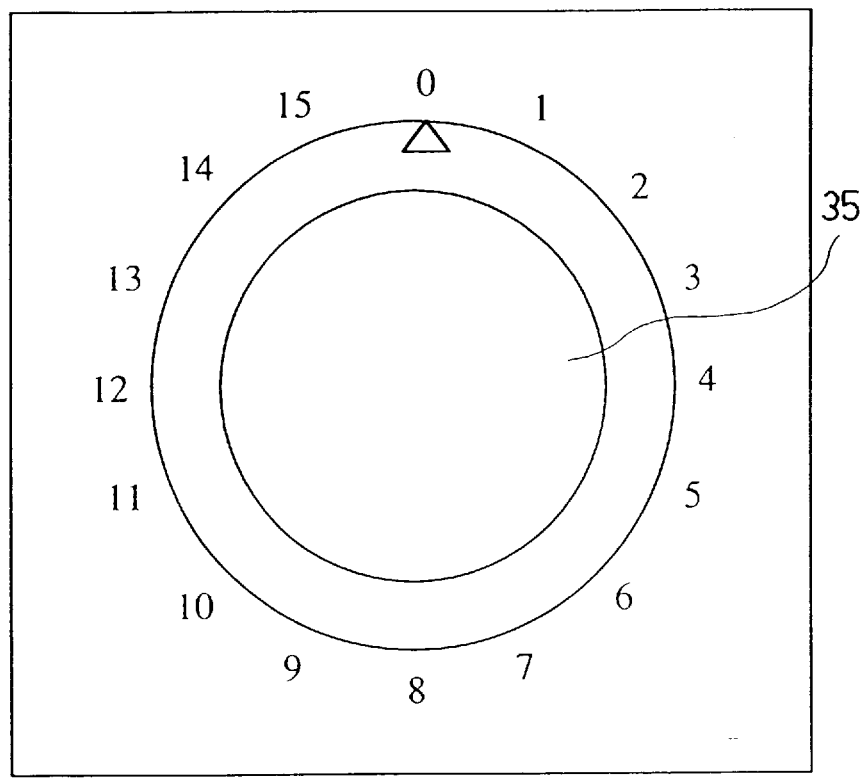
FIG. 4 is a schematic plan view of a offset dial to which the present invention is applied.
Figure 6:
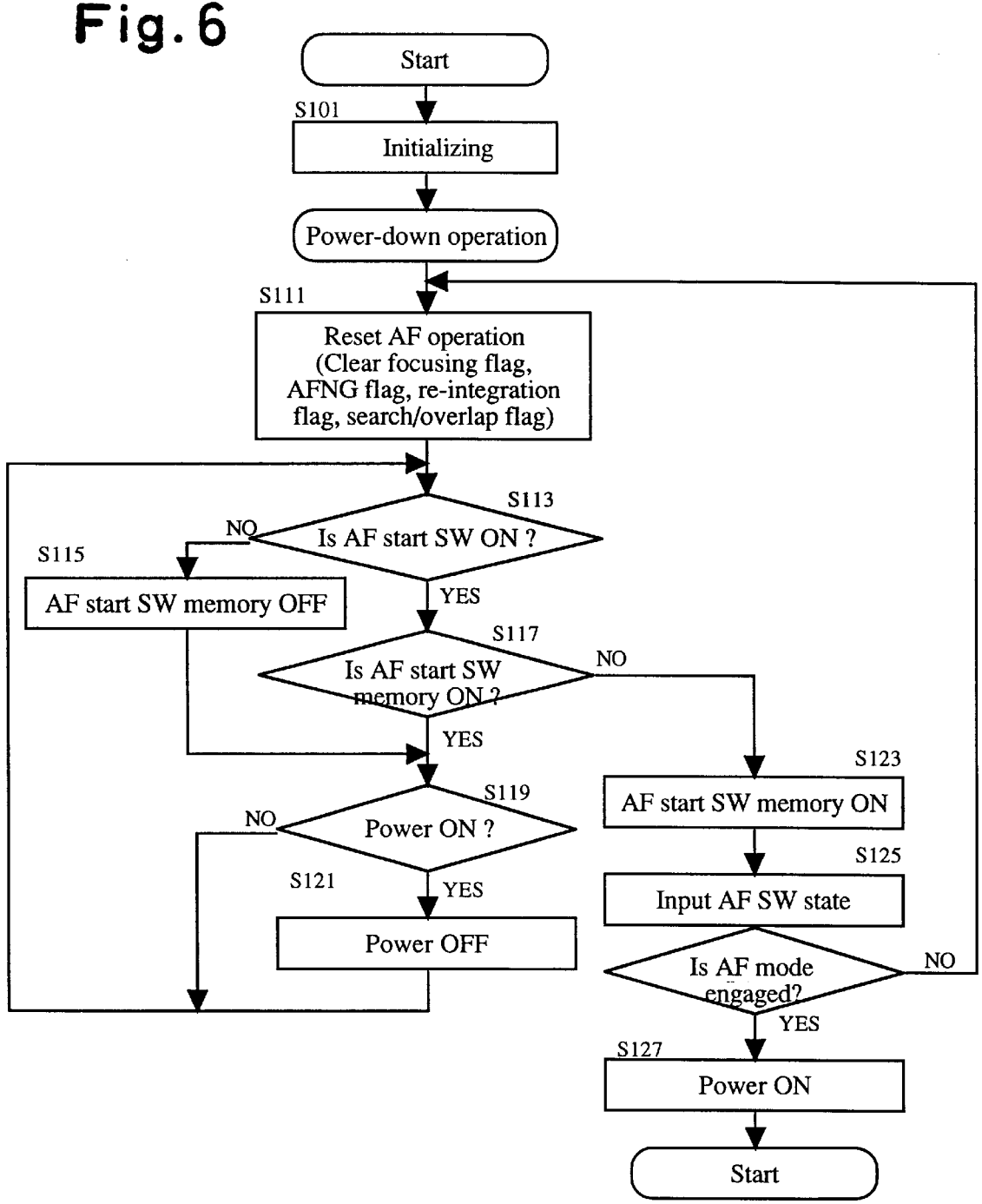
FIG. 6 is a flow chart of partial operation in an automatic focusing operation of an auto-level according to the present invention.
Figure 7:
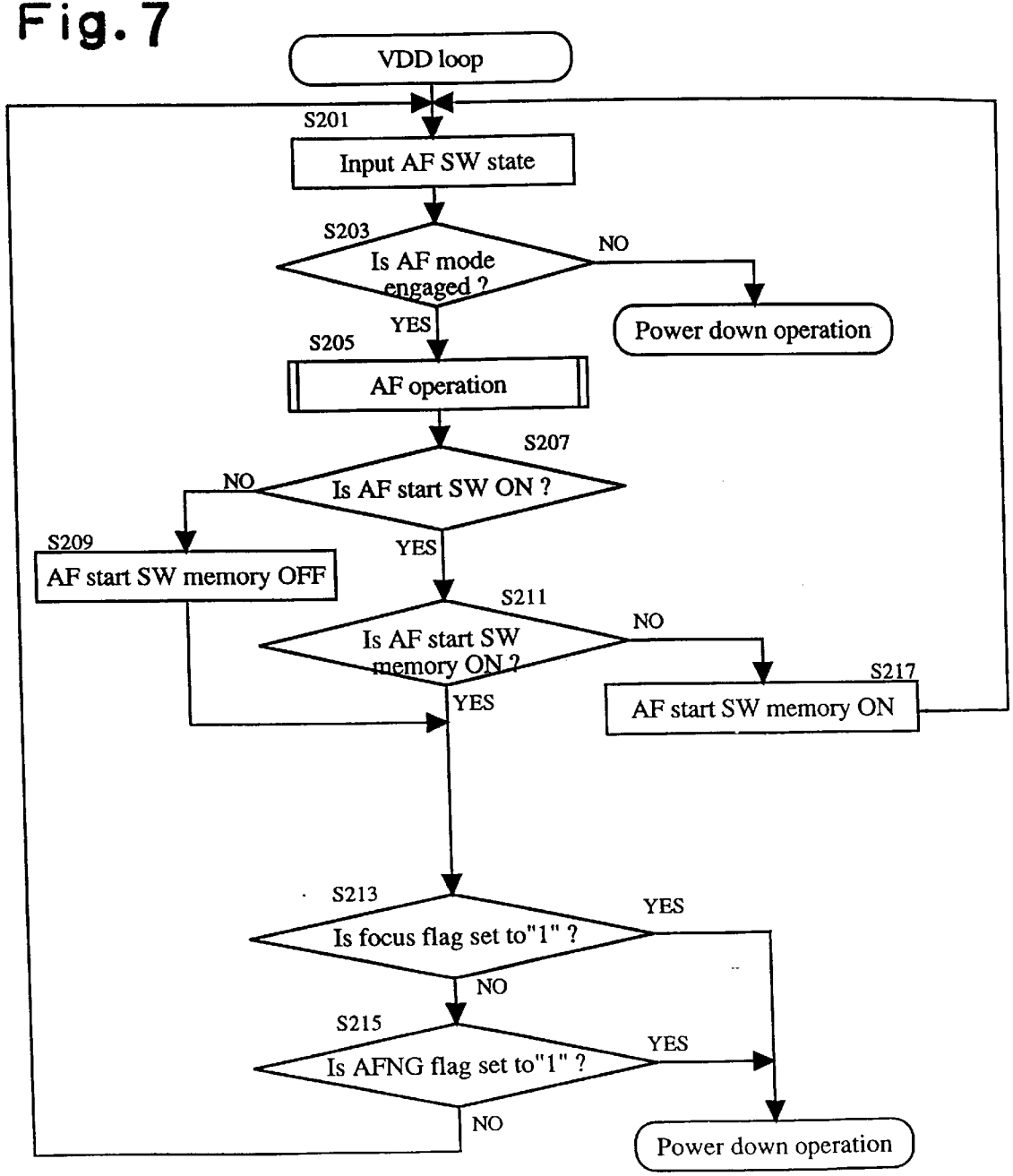
FIG. 7 is a flow chart of partial operation in an automatic focusing operation of an auto-level according to the present invention.
Figure 8:
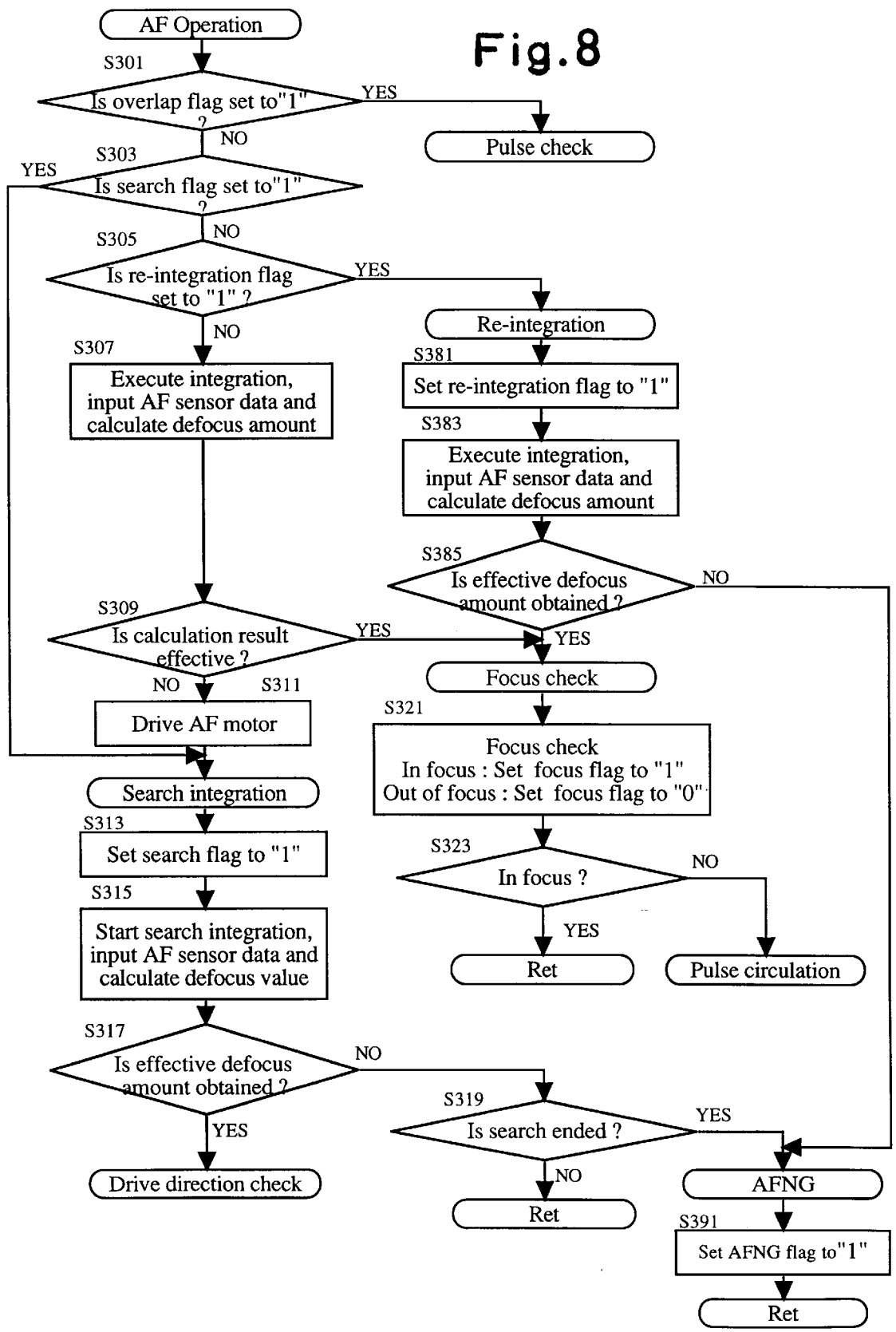
FIG. 8 is a flow chart of partial operation in an automatic focusing operation of an auto-level according to the present invention.
Figure 9:
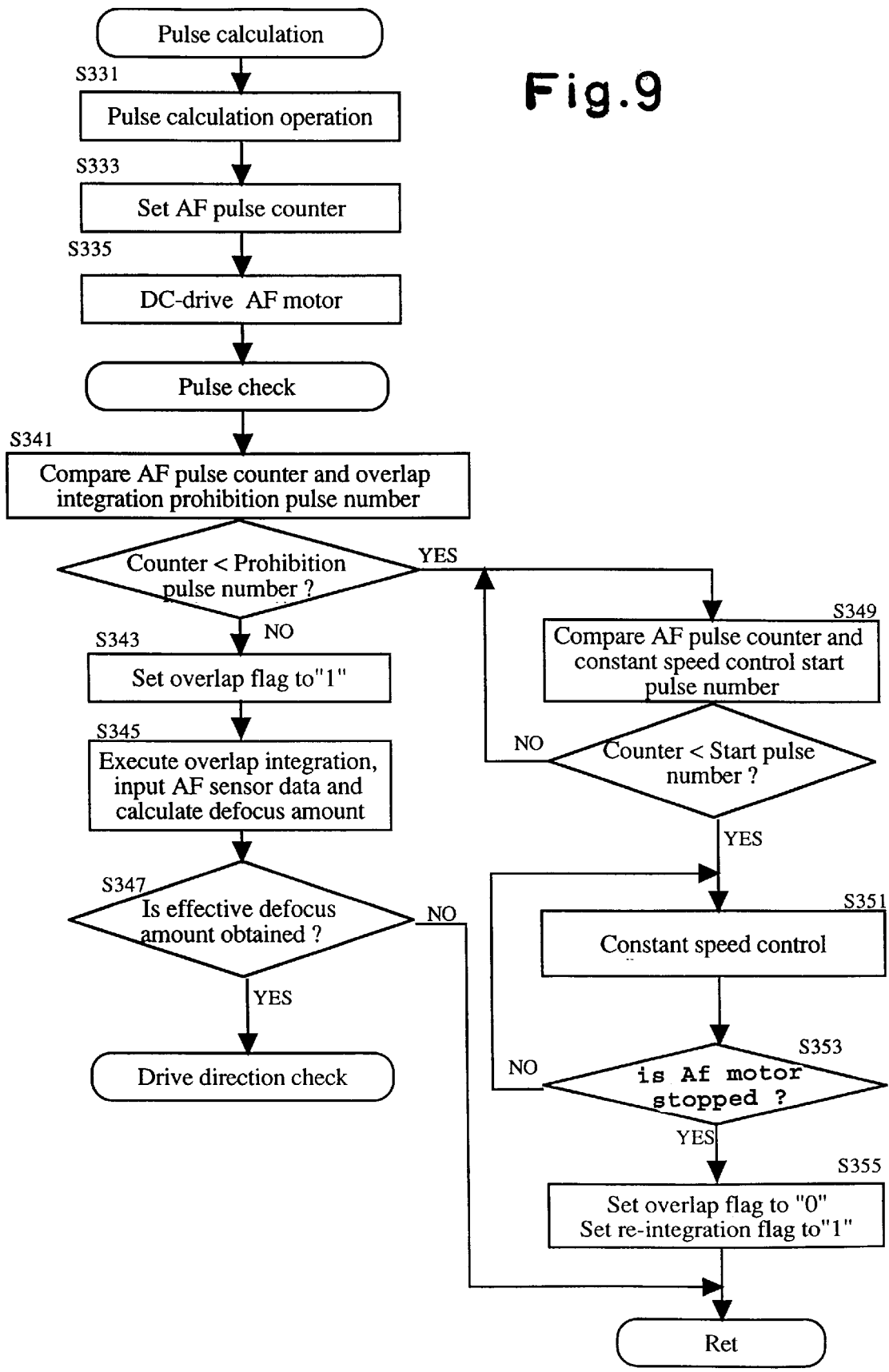
FIG. 9 is a flow chart of partial operation in an automatic focusing operation of an auto-level according to the present invention.
Figure 10:
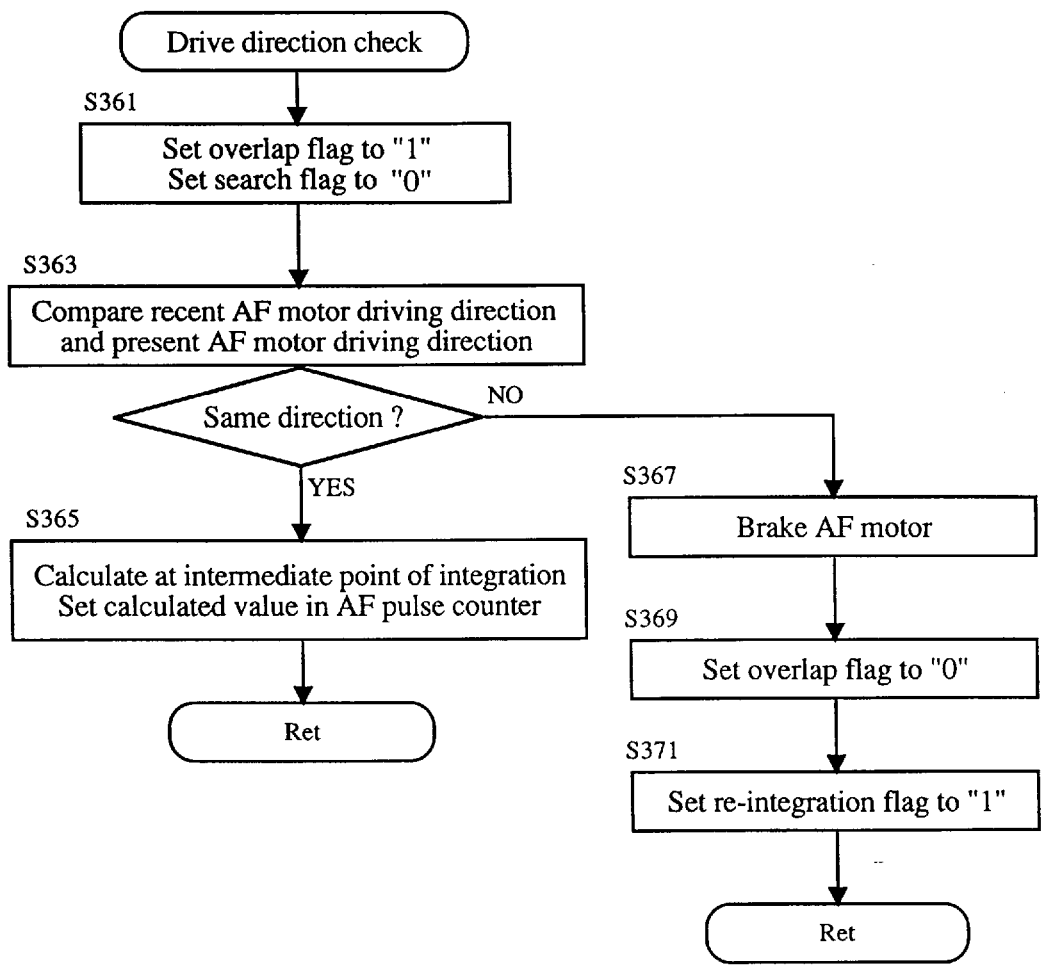
FIG. 10 is a flow chart of partial operation in an automatic focusing operation of an auto-level according to the present invention.

Therefore, in an embodiment of the present invention, there is provided an adjustment device that adjusts the defocus amount. As illustrated in FIG. 4, an offset (defocus) value is selected by an offset dial 35. The selected offset value is added to or deducted from the defocus amount that has been obtained by calculation. The user directs the auto-level 10 to the aiming object, and the AF start switch 27 is then turned ON in order to perform automatic focusing operation. At that time, when the image of the aiming object observed through the eyepiece 15 is out of focus, the user may rotate the offset dial 35. The AF start switch 27 is then turned ON again so that the automatic focusing operation may be re-started. Thus the setting of offset value may be performed by such an operation, (continued until accurate focusing is performed) and the aiming object can be clearly observed. As a result, automatic focusing on the aiming object is achieved.

The CCD line sensors 21 are provided with a monitor sensor unit 21d which controls integration time (light receiving time) according to the brightness of the object image. The monitor sensor unit 21d is provided with three monitor sensors M1, M2 and M3. The output of each monitor sensor is input to a calculation/control circuit 23. The calculation/control circuit 23 detects the output from the monitor sensors M1, M2 and M3, and controls the point in time when the integral operation of the CCD line sensor 21c is completed. A calculation/control circuit 23 may select and use any monitor among the monitor sensors M1, M2 and M3. The calculation/control circuit is connected to an EEPROM 6 for storing predetermined step values.

The AF sensor data, which is output from the pair of CCD line sensors 21c, is amplified by a preamplifier 22 before being supplied to the calculation/control circuit 23. The calculation/control circuit 23 calculates the amount of defocus (defocus amount) in accordance with the AF sensor data. In the illustrated embodiment, in addition to the defocus amount, the displacement and direction of the movement of an AF motor 31 (the number of output pulses, referred to hereinafter as AF pulses of an encoder 33) necessary to move the focusing lens 12 until the defocus amount becomes zero is also calculated in accordance with the defocus amount.

The calculation/control circuit 23 drives the AF motor 31 through an AF motor drive circuit 25 in accordance with the rotational direction of the AF motor 31 and the number of AF pulses. The rotation of the AF motor 31 is transmitted to the pinion 12b through a clutch-incorporating reduction gear 32 to move the focusing lens group 12 (see FIG. 1).

The rotation of the AF motor 31 is detected and counted by the calculation/control circuit 23 in accordance with the pulses output from the encoder 33. Thus, the driving or stopping is controlled in accordance with the counted value and the pulse numbers previously calculated. The focus detector 20 and the focusing lens group drive system (the lens driver) 30 moves the focusing lens group 12 in the optical axis direction in accordance with the object distance to carry out the automatic focusing operation.

The focus detector 20 is provided with an AF start switch 27 which is actuated to start the automatic focusing operation, an AF switch 29 which detects the AF mode (that is, the mode which is not the manual focus mode), and an offset dial 35. The AF start switch 27 is a momentary on push button switch, is turned ON when pressed by an operator, turned OFF when pressing is removed. The movement of the AF switch 29 is synchronized with the movement of a focusing operation knob 16 in the axial direction. The AF switch 29 is turned OFF under the automatic focusing (AF) mode, e.g., namely when the focusing operation knob 16 is pressed.

The offset dial 35 is a rotary switch operable by the user to correct the previously described errors, such as the change of focal point of lens system of the AF sensor 21 due to change of humidity or temperature, or the inaccurate defocus amount due to a change in the length of the optical path (see FIG. 4).

The pinion 12b is driven in either a manual focus mode in which a manual focusing operation is carried out using a manual focusing operation knob 16, or in an autofocus (AF) mode in which an automatic focusing operation is carried out in accordance with the focus detector 20 and the focusing lens group drive system 30. That is, the focusing mode is switchable between the autofocus (AF) mode, in which the focusing lens group 12 is driven in accordance with the output of the focusing detector 20, and the manual focus mode, in which the focusing lens group 12 is driven manually, regardless of the output of the focus detector 20.

For instance, when the manual focusing operation knob 16, which constitutes a mode switching means, is moved in one direction along the optical axis, the manual mode is obtained, and when the manual focusing operation knob 16 is moved in the opposite direction along the optical axis, the autofocus mode (AF mode) is obtained. The calculation/control circuit 23 detects whether the manual focusing operation knob 16 is switched to the autofocus mode when the AF switch 29 is turned ON.

The automatic focusing operation of the auto-level 10 is discussed below with reference to the flow charts shown in FIGS. 6 through 13. The automatic focusing operation is performed by the calculation/control circuit 23 when a battery (not shown) is loaded in the auto-level 10.

When an (unillustrated) battery is loaded, the initialization operation of step 101 is actuated. Firstly, an internal RAM and input /output ports, etc., of the calculation/control circuit 23 are initialized at step S101 to enter the power-down operation. Thereafter, the operation at step S101 is not performed unless the battery is unloaded and then is reloaded.

The power-down operation corresponds to a stand-by operation in which the power source is OFF while the AF start switch 27 is OFF to wait for the operation of the AF start switch 27. If the AF start switch 27 is turned ON, the power source is turned ON to perform the focusing operation.

In the power-down operation, a flag for the AF operation (focusing operation) is cleared (set to be zero), so that the operation ends (step S111). In the illustrated embodiment, there are several kinds of flags including a focusing flag which represents that the focused state is obtained; an AFNG flag which represents that the automatic focusing operation cannot be carried out; a re-integration flag which represents that the integration operation is performed after the focused state has been obtained; a search/overlap flag which is adapted to discriminate that the integral operation is performed during the movement of the focusing lens 12, and a defocus OK flag which represents that the effective defocus amount is obtained.

If the reset operation for the AF operation is completed, whether or not the AF start switch 27 is turned ON is checked (step S113). Since the AF start switch 27 is OFF at the initial position (i.e., the position in which no operation by the operator occurs), the AF start switch memory is OFF (OFF data is written) at step S113, 115. Thereafter, whether or not the power source is ON is checked at step S119. Since the power source is OFF at the initial position (in which no power is supplied to each circuit), the control is returned to step S113 and the operations at steps S113, 115 and 119 are repeated.

If the AF start switch 27 is turned ON, the following operation is performed. The control proceeds to step S117 from S113 to check whether the AF start switch memory is ON. As the AF start switch memory is OFF at the first time, control then proceeds to step S123 to turn the AF start switch memory ON (write ON data) which corresponds to the manual focusing mode, the control is returned to the power down operation (at step S123). Thereafter, if the AF switch 29 is turned OFF, as in the manual focusing mode, the control is returned to the power--down operation (steps S125, S111). If the AF switch 29 is turned ON, the power source is turned ON to supply power to the circuits in order to perform the VDD loop operation (steps S125, S127).

When control is returned to the power-down operation, the AF start switch memory is turned ON. Consequently, since the AF start switch 27 is ON, control proceeds from steps S111, S113, S117, S119 to step S121, to stop the power supply and to then wait for the AF start switch 27 to be turned ON. If the AF start switch 27 is turned OFF, control proceeds to step S115 from step S113 to write the OFF data in the AF start switch memory. Thereafter, control proceeds to step S121 from step S119, to stop the power supply and then to wait for the AF start switch 27 to be turned ON.

In the VDD loop operation, the focusing operation is carried out to obtain a focused state while detecting the state of the AF switch 29 and if focusing is not possible the control is returned to the power-down operation.

When the control enters the VDD loop operation, the state of the AF switch 29 is again input (step S125). If the AF switch 29 is OFF (which corresponds to the manual focus mode) the control is returned to the power-down operation (steps S201, S203) and the AF operation ends. The following discussion, relating to the AF operation, will be given on the assumption that the AF switch 29 is ON.

If the AF switch 29 is ON, the AF operation (focusing operation) is performed to detect the defocus amount and move the focusing lens 12 to a focal position in accordance with the defocus amount (step S205). During the AF operation, whether the AF start switch 29 is ON is periodically checked (step S207). At the first check, the AF start switch 27 is usually ON. Accordingly, whether or not the AF start switch memory 29 is ON is then checked. Since the AF start switch memory has been turned ON at step S123, the focus flag and the AFNG flag are checked at steps S211, S213, S215. Since the focus flag and the AFNG flag are both cleared either if no focused state was obtained or if the impossibility of the focusing operation was detected during the AF operation, the control is returned to step S201.

The operations at steps S201, S203, S205, S207, S211, S213, and S215 are repeated until the focus flag is set "1" or the AFNG flag is set to "1". If the AF start switch 27 is OFF during such an operation, control proceeds to step S209 from step S207 to store the OFF data in the AF start switch memory, and is repeatedly returned to step S201 from step S215.

Normally, the focusing lens 12 is moved to the focal position during the AF operation at step S205. Consequently, the focus flag is set to "1" and control is returned from step S213 to the power-down operation in order to finish the AF operation. If focusing cannot be effected for some reason, for example, when the aiming object moves or is too dark or is too low in contrast, the AFNG flag is set to "1" to return control to the power-down operation (S215), and thus control ends (step S111).

When control is returned to the power-down operation, the AF start switch memory is turned ON as long as the AF start switch 27 is ON. Consequently, control proceeds from steps S113, S117, S119 to step S121, to stop the power supply. If AF start switch 27 is turned OFF, control proceeds to step S115 from step S113 to write OFF data in the AF start switch memory. Thereafter, control proceeds to step S121 from step S119, to stop the power supply and then to wait for the AF start switch 27 to be turned ON.

In any of the above cases, when control is returned to the power-down operation, the power supply is stopped, i.e., the power supply to the peripheral circuits other than the calculation/control circuit 23 is cut.

If the AF start switch 27 is turned ON again after it has been turned OFF during the VDD loop operation, the control proceeds to step S211 from step S207. Since the AF start switch memory is OFF at the first step, the control proceeds to step S217 from step S211 to store ON data in the AF start switch memory. Thereafter, the control is returned to step S201.

As can be understood from the foregoing, once the AF start switch 27 is turned ON, the focusing operation is repeated until a focused state is obtained or the impossibility of the focusing operation is detected. Thus, the user can execute the surveying operation without worrying about the focusing operation.

If the AF start switch 27 is turned ON during the VDD loop operation, namely, if the manual focusing operation knob 16 is moved to the manual focus position, the control is returned from step S203 to the power-down operation and then the AF operation ends.

The AF operation will be described below in detail with reference to the flow charts shown in FIGS. 8 through 13. When control enters the AF operation, the overlap flag, the search flag and the re-integration flag are checked (steps S301, S303, S305). Since all the flags have been cleared at step S111 at the first step, the AF sensor executes the integration and the integration result is input as AF sensor data to calculate the defocus amount (step S307). As is well known, in the calculation of the defocus amount, a correlation ratio of the data of a pair of AF sensors is obtained, so that the direction of defocus (front focus or rear focus) and the defocus amount can be obtained in accordance with the correlation ratio.

Whether or not the calculation result is effective is checked at step S309. If the contrast of the aiming object is too low, if the aiming object is a repetitive pattern, or if the object brightness is too low, there is a possibility that the calculation result is ineffective. Normally, an effective calculation result is obtained, and hence the effective calculation result is discussed below first.

If the calculation result is effective, the focus check operation is performed. If a focused state is obtained the focus flag is set to "1", and if the telescope is out-of-focus the focus flag is set to "0" (step S321). In the illustrated embodiment, when the defocus amount is within a predetermined limit or allowance, it is considered that a focused state is obtained. If the focused state is obtained at step S323, the control is returned to the VDD loop operation to perform the operations at step S207 and steps subsequent thereto. In the case of an out-of-focus state, the control proceeds to the pulse calculation operation (step S323).

In the pulse calculation operation, the amount of drive of the AF motor 31 (the number of AF pulses supplied from the encoder 33) necessary to move the focusing lens 12 until the defocus amount is zero is calculated.

In the pulse calculation operation, the drive direction of the AF motor 31 and the number of AF pulses are calculated in accordance with the defocus amount (step S331). Subsequently, the AF pulse number is set in the AF pulse counter 23a and the AF motor 31 is DC-driven and pulse checking is carried out (steps S333, S335). The value of the AF pulse counter 23a is decreased by one every time one AF pulse is output from the encoder 33.

In the pulse check operation, the drive speed of the AF motor 31 is controlled in accordance with the value of the AF pulse counter 23a. Namely, the counted number is larger than an overlap integration prohibition pulse number. The AF motor 31 is driven at a high speed to move the focusing lens 12 toward the focal position within a short space of time and overlap integration is effected. When the counted number is smaller than the overlap integration prohibition pulse number, the AF motor 31 is driven at high speed, but the overlap integration is prohibited. If the counted number is smaller than a constant speed control start pulse number, the AF motor 31 is PWM (Pulse Width Modulation)—driven at low speed to prevent the focusing lens from moving to a hyperfocal distance of the telephotographic system. When the counted number is zero, the AF motor 31 is stopped.

When the control enters the pulse check operation, the value of the AF pulse counter 23a is compared with the overlap integration prohibition pulse number (step S341). If the counter value is larger than the overlap integration prohibition pulse number, the control proceeds to step S343 in which the overlap flag is set to "1". Thereafter, the overlap integration begins, and the AF sensor data is input from the AF sensor 21 to perform the defocus amount calculation (step S345). If an effective calculation result is obtained, control proceeds to the drive direction check operation, and if no effective calculation result is obtained, control is returned (step S347).

In the drive direction check operation, the AF pulse number is calculated and set in the counter, the AF pulse number being based on the AF sensor data obtained by the integration during driving of the AF motor 31. If the drive direction changes, the AF motor 31 is braked and stopped. In the illustrated embodiment, the AF motor 31 is braked by a short-circuit of the AF motor 31 at the opposite electrodes thereof.

When the control enters the drive direction check operation, the overlap flag is set to "1", and the search flag is set to "0" (step S361). Thereafter, the previous and present drive directions of the focusing lens group 12 are compared in accordance with the calculation result (step S363). Normally, the directions are identical, and hence, the AF pulse number is calculated at an intermediate point of the integration, so that the calculated value is set in the counter (steps S363, S365). Subsequently, control is returned.

If the drive direction changes, the AF motor 31 is braked and stopped. Consequently, the overlap flag is set to "0" and the reintegration flag is set to "1". Thereafter, control is returned to the VDD loop operation (steps S363, S367, S369, S371).

When control is returned to the VDD loop operation, the operations at step S207 and steps subsequent thereto are carried out to enter the AF operation. If no change in the drive direction occurs, the control proceeds to the pulse check operation from step S301 (since the overlap flag is set to "1"). The operations from step S341 to S347 and the operations of the drive direction check operation from step S361 to S365 are carried out, and control is returned to step S205 for the pulse check operation. These operations are repeated until the counter value is smaller than the overlap integration prohibition pulse number. In the above mentioned operations, usually, the pulse number necessary to move the focusing lens to the focal position is decreased and becomes smaller than the overlap integration prohibition pulse number. Thus, control proceeds from step S341 to S349 of the pulse check operation.

The operations from step S349 to S355 are effected to stop the AF motor 31 upon completion of the driving of the AF motor corresponding to the calculated pulse number. At step S349, control dose not proceed until the AF pulse number is smaller than the constant speed control start pulse number. If the AF pulse number is smaller than the constant speed control start pulse number, the AF motor 31 is driven at a low speed in accordance with the remaining pulse number. When the pulse number is zero, the AF motor 31 is stopped (step S349, S351, S353). When the AF motor 31 is stopped, the overlap flag is set to "0", and the reintegration flag is set to "1" (steps S353, S355). Thereafter, control is returned to the VDD loop operation.

If control proceeds to step S205 of the VDD loop operation, control then enters the re-integration operation at step S305 (since the overlap flag and the search flag are set to "0" and the re-integration flag is set to "1"). The same is true when the drive direction changes at step S363.

In the re-integration operation, the defocus amount is calculated, and whether or not the telescope is focused is checked in accordance with the defocus amount thus obtained. If the focused state is obtained, the focus flag is set to "1", and if the focused state is not obtained, the AF pulse is calculated again to move the focusing lens.

If control is returned to the VDD loop operation when the focus flag is set to "1", control proceeds to the power down operation from step S213. Thus, the AF operation ends and the control waits for the operation of the AF start switch 27.

The above discussion can be applied when the focused state is correctly obtained. In the case that it is difficult or impossible to obtain a focused state for some reason, control enters, the VDD loop operation and is returned to the power-down operation. This will be discussed below.

In the first AF operation, integration begins, the AF sensor data is input, and the defocus amount is calculated at step S307 (steps S301, S303, S305). If it is impossible to calculate the effective defocus amount for some reason, i.e., for example when the object contrast is too low, the control proceeds to the search integration operation from step S309.

In the search integration operation, the integration and the defocus calculation are carried out to obtain an effective defocus amount while driving the AF motor 31 from a close focal position to an infinite focal position. If no effective defocus amount is obtained even by the search integration operation, the AFNG flag is set to "1" and control is returned and enters the power-down operation at step S215.

In the search integration operation, the AF motor 31 is search-driven (in the direction of the close focal position) and the search flag is set to "1" to commence the integration by the AF sensor 21. When the integration is completed, the integral value is input as the AF sensor data to calculate the defocus amount (steps S311, S313, S315). If the effective defocus amount is obtained, control proceeds to step S317 to the drive direction checking operation. If no effective defocus amount is obtained, the control is returned to the VDD loop operation to perform the operations at step S205 and steps subsequent thereto (steps S317, S319).

The AF motor search-driving operation refers to an operation in which the AF motor 31 is first driven in the direction of the close focal position. When the focusing lens 12 reaches and stops at a movement extremity on the close distance side, the AF motor 31 is driven in the reverse direction, i.e., in the infinite focal position. When the focusing lens group 12 reaches and stops at a movement extremity on the infinite object distance side, the AF motor 31 is stopped. If an effective calculation result is obtained during the search driving, the AF motor is driven in accordance with the effective value of the defocus amount.

When control enters the operation at step S205 of the VDD loop operation, the overlap flag is cleared. Since search flag is set to "1", the control enters the search integration operation at step S303 and the search integration operations at step S313 and steps subsequent thereto are carried out. If no effective calculation result is obtained when the focusing lens group 12 reaches the infinite focal position, control enters the AFNG 15 operation, in which the AFNG flag is set to "1". Thereafter, control is returned to the VDD loop operation and enters the power-down operation at step S215 (steps S317, S319, S391).

The above discussion has been directed to the case when no effective calculation result is obtained from the beginning. Once an effective calculation result is obtained (so that the focusing lens 12 is moved but no focused state is still obtained), if no effective calculation result is obtained by the re-integration operation (steps S381, S383), the control proceeds to the AFNG operation at step S385. The AFNG flag is set to "1" in the AFNG operation and thereafter, the control is returned to the VDD loop operation and enters the power-down operation at step S215 (S385, S391).

Figure 11:
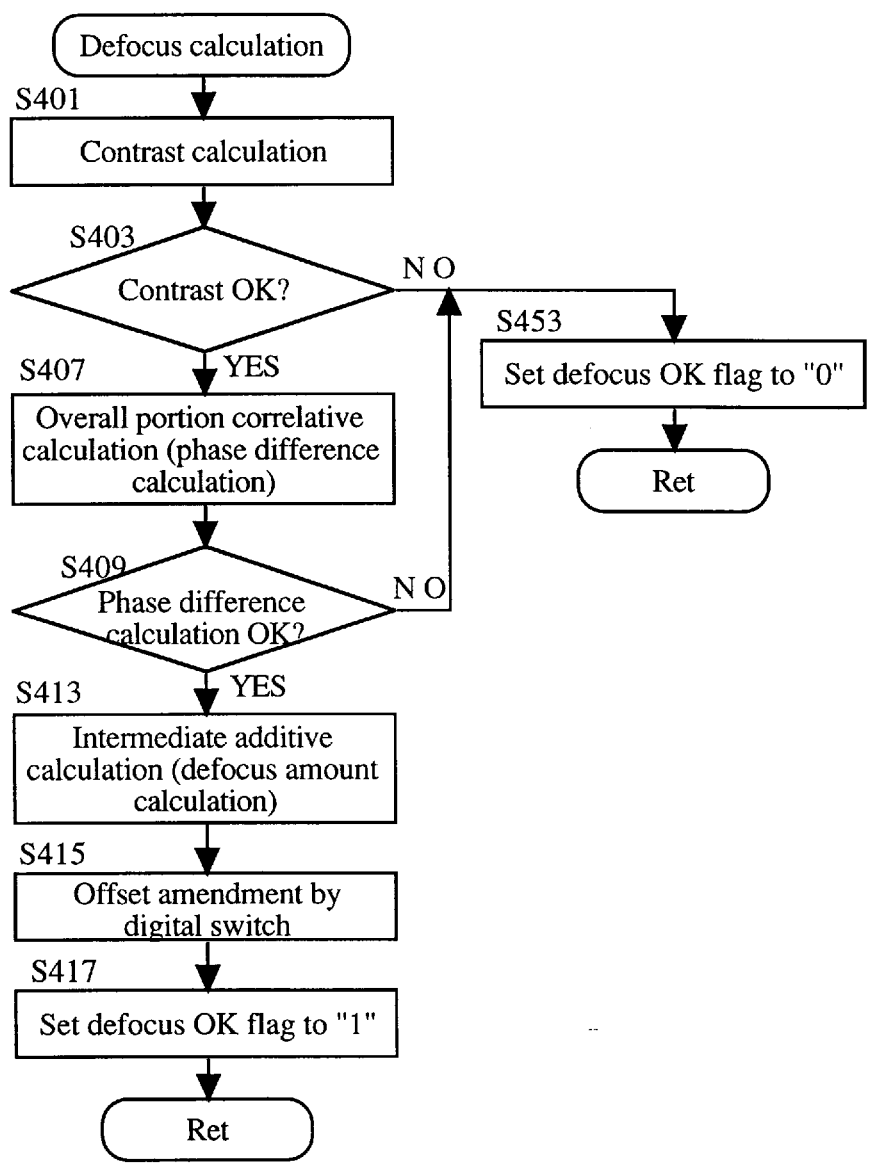
FIG. 11 is a flow chart of a defocus calculating operation in an automatic focusing operation of an auto-level according to the present invention.

The details of the defocus operation are described with reference to FIG. 11, which is executed at steps S307, S315, S345 and S383. The creditable factor used for the present embodiment is whether the contrast thereof is high or low. The defocus operation in the present embodiment firstly detects a contrast at the maximum focus detecting portion Z. When the effective contrast is more than the predetermined value, the contrast is detected in the order from the narrowest focus detecting portion Z1. If no effective contrast is obtained, the contrast is checked in the order of the focus detecting portions Z2, Z3 and z4 until the effective contrast is obtained. Thereafter, the defocus amount is calculated by using the AF data in any of the focus detecting portions (namely, the narrowest portion), and the focusing lens group 12 is driven in accordance with the obtained defocus amount. If no effective contrast is obtained in any of the select focus detecting portions Z1 through Z4, the focusing is operated by using the AF data in the maximum focus detecting portion Z.

When control enters the defocus operation, the contrast calculation is firstly executed based on the AF data from the maximum focus detecting portion Z (step S401). The contrast calculation utilizes, for example, the sum of the absolute value of the remainders of the integration value of the pixels (photoelectric transducers) adjacent to the used portion.

$$\sum_{n=s}^{N-1} |A_n - A_{n+1}| \qquad \text{(Formula 1)}$$

In formula 1 given above, "S" represents the bit number of the first pixel in the focus detecting portion, and "N" represents the bit number of the last pixel in the focus detecting portion.

As can be understood from the above formula, if the sum of the remainders of the integrated value is larger than the predetermined value, it is judged that sufficient contrast has been obtained. On the other hand, in the case that is judged no effective contrast has been obtained, the defocus OK flag is set to "0", and control returns (steps S403, 453). The defocus OK flag represents whether or not an effective defocus is obtained.

When the effective contrast not less than the predetermined value is obtained, the correlative calculation is executed by using the AF data obtained in the focus detecting portion, and hence, the phase difference is calculated (steps S403, 407). If no phase difference is calculated, the flag clearance operation is executed at step S453, then the control is returned (S409). If no focused position of the image formed on the pair of the focus detecting portions Z is detected (such as the case that the image formed on the focus detecting portion Z is extremely out-of-focus) it is impossible to calculate the phase difference.

When the effective phase difference is obtained, control proceeds to the intermediate additive calculation operations and the defocus amount is calculated (steps S409, S413). Then the correction is performed according to an offset amount set by the offset dial 35, the defocus flag is set to "1" (steps S413, S415, S417), and control is returned.

Figure 12:
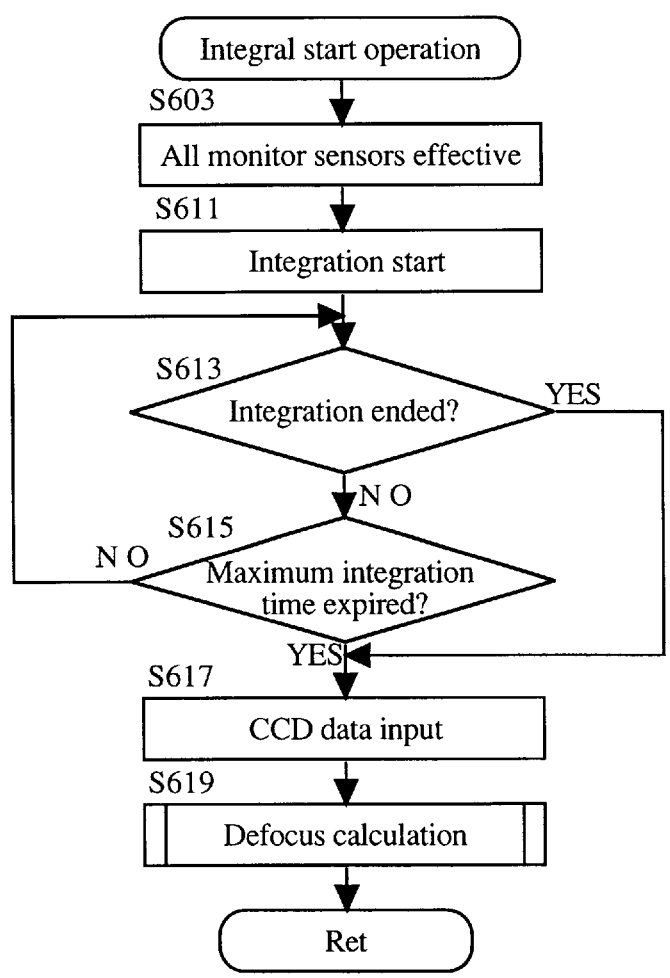
FIG. 12 is a flow chart of an integration start operation in an automatic focusing operation of an auto-level according to the present invention.

The integration start operation, which is executed at steps S307, S315, S345 and S383, is discussed below with reference to the flow chart shown in FIG. 12.

When control enters the integration start operation, all the monitor sensors become effective at step S603, and the integration starts at step S611.

The integration ends at the earliest time of two, times that is, the earliest of (1) when output of the monitor sensor goes below an AGC (automatic gain control) level, or (2) when the maximum integration time expires. The CCD data (AF sensor data) is then input, the defocus calculation is executed (steps S611, S613, S615, S617, S619), control is returned.

Figure 13:
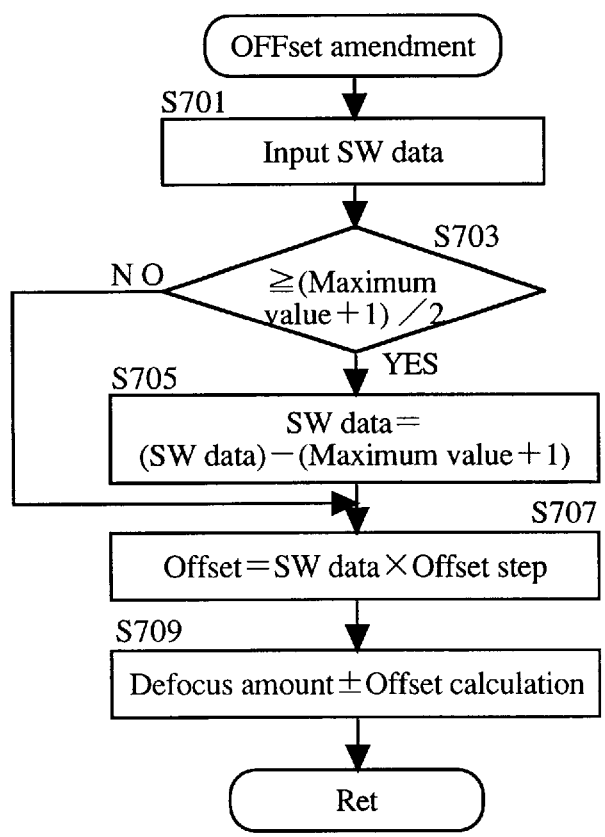
FIG. 13 is a flow chart of an offset amendment operation in an automatic focusing operation of an auto-level according to the present invention.

The offset correction operation is discussed below with reference to the flow chart shown in FIG. 13. The offset correction operation represents adjustment of the calculated defocus amount corresponding to the amount of offset set by the offset dial 35. When control enters the offset correction operation, data of rotational position of the offset dial 35 is input as switch data (SW data). The offset value corresponding to the position of the offset dial 35 is calculated, and is then added to the defocus amount so that the adjustment is performed. The offset value is adjusted through rotational operation of the offset dial 35 by the user. For example, the user views a surveying staff, standing at a predetermined distance, by the auto-level 10. The AF start switch is turned ON to start the automatic focusing operation, the user then observes whether or not the focusing is accurately performed on the staff. If focusing is not accurately performed, the user rotates the offset dial 35 in order to adjust the offset value, and the AF start switch 27 is then turned ON again to re-start the automatic focusing operation. The operations are continued until the user observes the staff and judges that the accurate focusing of the staff has been achieved.

Digital switches may be used in the offset dial 35. For example, in the case of a four-bit digital switch, there are 16 (sixteen) switch positions provided, and switch data of 0 through 15 are assigned to the 16 switch positions thereof. If any switch data among 0 through 7 is obtained, plus correction operation is performed, and if any switch data among 8 through 15 is obtained, minus correction operation is performed. The offset value is obtained through multiplication of the obtained switch data by a predetermined step value (stored in the EEPROM 6). The relation discussed herein is illustrated in the table (A) shown in FIG. 5.

Similarly, in the case of an eight-bit digital switch, there are 256 (two hundred fifty six) switches provided, and switch data (value) of 0 through 255 are assigned to the 256 switch positions thereof. If any switch data from 0 through 127 is obtained, plus correction operation is performed, and if any switch data among 128 through 255 is obtained, minus correction is performed. The offset value is obtained through multiplication of the obtained switch data by a predetermined step value. The relation discussed herein is illustrated in the table (B) shown in FIG. 5.

The predetermined step value has been stored in an EEPROM 6. In an embodiment of the present invention, the step value is set to 10 $\mu$m, but any predetermined step value or step number can be set. Furthermore, any type of switch other than the digital switch can be applied to the offset dial 35, such as a so-called up/down switch which writes a predetermined value to the EEPROM 6.

The offset value of the offset dial 35 is 0 at the initial position. The offset value increases from 0 when the offset dial 35 is rotated in one direction, and the offset value decreases from 0 when the offset dial 35 is rotated in the other direction. Accordingly, when the offset dial 35 is rotated in one direction, the focusing gradually becomes "front focus", and when the offset dial 35 is rotated in the other direction, the focusing gradually becomes "rear focus".

When control enters the offset operation, the switch data of the offset dial 35 is input at step S701. In the first embodiment, the offset dial 35 is a four-bit digital switch. Therefore, the maximum value of the switch data is 15 (fifteen).

When the switch data is less than the value:
(maximum value+1)÷2 equals 8
namely 0 through 7, the offset value is obtained by a formula:

(Switch data)×(Predetermined step value)

thus the obtained offset value is added to the defocus value (steps S703, S707, S709), and control is returned.
When the switch data is not less than the value:
(Maximum value+1)÷2 equals 8
namely 8 through 15, the minus switch data is set by a formula:

(Switch data)=(Switch data)−(Maximum value+1)

and the offset value is obtained by a formula:

(Switch data)×(Predetermined step value)

thus the obtained offset value is added to the defocus value (steps S703, S705, 707, S709), and control is returned.

In the offset correction operation as discussed above, when an error occurs in the AF sensor 21 due to change of humidity or temperature, etc. The error can be compensated for by the user, enabling observation of the clear image of the aiming object. In addition, the operation in the present embodiment only relates to addition or deduction of adjustment value (offset value) to/from the defocus amount, thus the calculation operation is very simple.

The present invention may also utilize so-called up/down switch instead of the digital switch 35, so that the up/down switch changes the offset value, and the changed offset value is stored in the EEPROM 6.

In the above-mentioned embodiment, the CCD line sensor 21c is used as the focus detecting device. Alternatively, it is possible to use an MOS type of line sensor.

Although the above-mentioned embodiment is applied to an auto-level, the present invention can be equally applied to other surveying instruments, such as a transit, or a telescopic optical system such as a telescope or a binocular telescope, etc.

As may be understood from the foregoing, according to the present invention, there is an automatic focusing apparatus provided, incorporating a focus detecting device which detects the defocus amount of the image optical system, and a focus 0 device which focalizes based on the defocus amount detected by the focus detecting device. The automatic focusing apparatus further incorporates an adjustment device which adjusts the defocus amount, calculated by the focus detecting device, by a variable adjustment value. If an error of focal point occurs in the focus detecting device due to the effects of humidity or temperature, etc, it is possible to correct the error easily using the adjustment device.

What is claimed is:

1. An automatic focusing apparatus, comprising:
   an image optical system;
   a focus detecting device that calculates a defocus amount of said image optical system based on predetermined properties of the image optical system;
   a focusing device that focuses the image optical system based on said defocus amount calculated by said focus detecting device; and
   an adjustment device that compensates said defocus amount calculated by said focus detecting device by an adjustment value to correct said defocus amount for deviations from said predetermined properties of the image optical system.

2. An automatic focusing apparatus, according to claim 1, wherein said adjustment value is a variable adjustment value.

3. The automatic focusing apparatus according to claim 2, wherein said variable adjustment value of said adjustment device can be changed by a user.

4. The automatic focusing apparatus according to claim 2, wherein said adjustment device incorporates an externally operate digital switch of which external operation is possible, and said digital switch sets said adjustment value.

5. The automatic focusing apparatus according to claim 2, wherein said focus detecting device is a phase difference focus detecting device, an objective light diverted from said image optical system being split into two objective lights, each split objective light is formed on one of a pair of line sensors, and a defocus amount being obtained by detecting a phase difference of images formed on said pair of line sensors.

6. An automatic focusing apparatus according to claim 2, wherein said apparatus is incorporated in a surveying instrument.

7. An automatic focusing apparatus according to claim 6, wherein said image optical system further comprises:

an objective lens group;

a focusing lens group;

a focusing plate incorporating a reticle;

an eyepiece lens group for observing an object image formed on said focusing plate;

a beam splitter optical system positioned between said focusing lens group and said focusing plate, wherein said focus detecting device comprises a plurality of line sensors positioned horizontally along a light path split by said beam splitter optical system, and a calculation device that calculates a defocus amount based on a phase difference between a pair of images received by said line sensors.

8. An automatic focusing apparatus according to claim 7, wherein said image optical system is a telephotographic system.

9. An automatic focusing apparatus according to claim 5, wherein said adjustment value of said adjustment device is a value relating to a defocus amount, and said calculation device selectively adds said adjustment value set by said adjustment device, to said calculated defocus amount, and deducts said adjustment value set by said adjustment device from said calculated defocus amount.

10. The automatic focusing apparatus according to claim 4, wherein said digital switch comprises a two direction rotation dial having positive and negative adjustment values along the rotation of the dial.

11. The automatic focusing apparatus according to claim 4, wherein said digital switch is an n-bit switch having substantially half of the values formable from n bits assigned to linearly increasing positive adjustment values and substantially half of the values formable from n bits assigned to linearly decreasing negative adjustment values.

12. The automatic focusing apparatus according to claim 4, wherein data corresponding to a position of said digital switch is multiplied by a reprogrammable predetermined step value to obtain said adjustment value.

13. An automatic focusing apparatus, comprising:

a telephotographic system;

a focus detecting device that detects a focus state of said telephotographic system based on predetermined properties of the telephotographic system;

a focusing device that focuses the telephotographic system based on said focus state detected by said focus detecting device; and an adjustment device that compensates said focus state detected by said focus detecting device by an adjustment value to correct said defocus amount for deviations from said predetermined properties of the telephotographic system.

14. An automatic focusing apparatus in a surveying instrument, comprising:

a telephotographic imaging optical system including an objective lens group, a focusing lens group, a focusing plate incorporating a reticle, and an eyepiece lens group for observing an object image formed on said focusing plate;

a plurality of line sensors;

a beam splitter optical system, positioned between the focusing lens group and the focusing plate, for splitting said objective light into two objective light beams forming images on said line sensors;

a phase difference focus detecting device that detects a defocus amount of said imaging optical system, said phase difference focus detecting device including a calculation device that calculates the defocus amount based on a phase difference between the images formed on the line sensors;

a focusing device that focuses based on the defocus amount calculated by said focus detecting device;

an adjustment device, manually operable by an operator, that adjusts said defocus amount calculated by said focus detecting device by an adjustment value, the adjustment value being related to the defocus amount as an error due to assembly, temperature, or humidity variation, said calculation device selectively adjusting the calculated defocus amount by adding or deducting the adjustment value.

15. An automatic focusing apparatus of a surveying instrument, comprising:

a focus detecting device that detects a defocus amount of an image optical system;

a focusing device that focuses based on said defocus amount calculated by said focus detecting device; and a calibration device that calibrates a focus position error of said focus detecting device, the focus position error caused by assembly, temperature, and/or humidity, said calibration device obtaining an in-focus; condition by adjusting the defocus amount by selectively adding or subtracting a correction value corresponding to the focus position error.

16. An automatic focusing apparatus, comprising:

an imaging optical system;

a focus detecting device that detects a defocus amount of said imaging optical system, the defocus amount depending in part on predetermined physical dimensions of said imaging optical system;

an external control, accessible by an operator, for setting an offset to the defocus amount;

an automatic focusing system that focuses said imaging optical system based on the defocus amount and the offset, so that error in defocus caused by deviation from said predetermined physical dimensions are compensated by said external control.

* * * * *

UNITED STATES PATENT AND TRADEMARK OFFICE
CERTIFICATE OF CORRECTION

PATENT NO. : 5,856,664
DATED : January 5, 1999
INVENTOR(S) : S. SUZUKI, et al.

It is certified that error appears in the above-identified patent and that said Letters Patent is hereby corrected as shown below:

At column 15, line 3 (claim 4, line 3) of the printed patent, change "operate" to --operable--.

At column 15, line 3 (claim 4, line 3) of the printed patent, delete "of which external operation is possible".

At column 15, line 9 (claim 5, line 5) of the printed patent, insert --and-- before "each".

At column 15, line 9 (claim 5, line 5) of the printed patent, delete "is".

At column 15, line 10 (claim 5, line 6) of the printed patent, delete "and".

At column 15, line 39 (claim 9, line 5) of the printed patent, delete "," (first occurrence).

Signed and Sealed this

Twenty-ninth Day of February, 2000

Attest:

Q. TODD DICKINSON

Attesting Officer

Commissioner of Patents and Trademarks